(12) United States Patent
Lee

(10) Patent No.: US 7,123,972 B2
(45) Date of Patent: Oct. 17, 2006

(54) DRIVER'S INFORMATION SYSTEM FOR A VEHICLE

(75) Inventor: Ji Seok Lee, Yongin (KR)

(73) Assignee: Hyundai Motor Company, Seoul (KR)

( * ) Notice: Subject to any disclaimer, the term of this patent is extended or adjusted under 35 U.S.C. 154(b) by 415 days.

(21) Appl. No.: 10/701,998

(22) Filed: Nov. 4, 2003

(65) Prior Publication Data

US 2005/0004728 A1 Jan. 6, 2005

(30) Foreign Application Priority Data

Jul. 4, 2003 (KR) .................. 10-2003-0045290

(51) Int. Cl.
*G06F 7/00* (2006.01)

(52) U.S. Cl. ............... 700/36; 701/1; 701/49; 340/5.71; 340/425.5; 340/825.72; 280/735

(58) Field of Classification Search ............... 701/1, 701/36, 49; 340/5.71, 425.5, 825.72; 280/735; 455/420

See application file for complete search history.

(56) References Cited

U.S. PATENT DOCUMENTS

| 4,809,177 | A  | * | 2/1989 | Windle et al. .............. 701/1 |
| 6,246,935 | B1 | * | 6/2001 | Buckley ................... 701/36 |
| 6,336,152 | B1 | * | 1/2002 | Richman et al. ............. 710/8 |
| 6,411,874 | B1 | * | 6/2002 | Morgan et al. ............. 701/36 |
| 6,559,773 | B1 | * | 5/2003 | Berry .................... 340/815.4 |
| 6,854,010 | B1 | * | 2/2005 | Christian et al. ........... 709/223 |
| 6,885,968 | B1 | * | 4/2005 | Breed et al. ............... 702/143 |
| 2005/0046584 | A1 | * | 3/2005 | Breed .................... 340/825.72 |

FOREIGN PATENT DOCUMENTS

| DE | 19735976 | 2/1999 |
| DE | 10126165 | 10/2002 |
| DE | 10156053 | 11/2002 |
| JP | 2000-106069 | 4/2000 |
| JP | 2000-118330 | 4/2000 |
| JP | 2000-203356 | 7/2000 |
| JP | 2000-344027 | 12/2000 |
| JP | 2001-350570 | 12/2001 |
| JP | 2002-318702 | 10/2002 |
| JP | 2003-507241 | 2/2003 |
| KR | 2001-0022537 | 3/2001 |

* cited by examiner

*Primary Examiner*—Thomas Black
*Assistant Examiner*—McDieunel Marc
(74) *Attorney, Agent, or Firm*—Morgan Lewis & Bockius LLP

(57) ABSTRACT

A driver's information system is provided which comprises a user interface module, a function module, and a control unit. The user interface module comprises at least one component, a state of which can be changed by manipulation of a user, and it is configured to determine a state of the component. The function module comprises at least one execution command signal generating unit for generating execution command signals. The control unit is configured to receive the execution command signal from the function module and to actuate various devices responding to the execution command signal.

3 Claims, 3 Drawing Sheets

DRIVER'S INFORMATION SYSTEM FOR A VEHICLE

CROSS-REFERENCE TO RELATED APPLICATIONS

This application claims priority of Korean Application No. 10-2003-0045290, filed on Jul. 4, 2003, the disclosure of which is incorporated fully herein by reference.

FIELD OF THE INVENTION

The present invention relates to a driver's information system (DIS) for a vehicle.

BACKGROUND OF THE INVENTION

A driver's information system is a system that is able toe control various vehicle devices with a driver interface (for example, a monitor) using network technology. For example, the driver's information system may control a multi-media device such as an audio system, a video system, a navigation system, a telematic system, and a CD player, and it may further control a cabin room temperature, a seat position, a steering wheel position, a door, a mirror, or the like.

That is, the driver's information system provides integrated controls of various devices of a vehicle such as an air-conditioning system and an AV system, and thereby provides a direct and convenient user interface. Using such a driver's information system, a driver can easily control various utility devices.

A typical prior driver's information system includes a software portion and a hardware portion. The software portion is a part for receiving an input command from a driver and generating a corresponding execution command signal, and the hardware portion is a kind of actuator for actuating various vehicle devices.

In such prior driver's information systems, determining a state of the component of the driver interface and generating a corresponding execution signal are typically performed in a single software module. Therefore, when such prior driver's information systems are updated, a part for processing the manipulation logic and a portion for generating the execution command signal must be also be changed. Therefore, it is not easy to update the prior driver's information system.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide a driver's information system in which a software portion is divided into a user interface module and a function module so that the user interface module and the function module can be updated separately, and in which states of some components are interconnected with each other so that more complicated command executions can be performed simultaneously.

In a preferred embodiment of the present invention, the driver's information system comprises a user interface module, a function module, and of control unit. The user interface module comprises at least one component, the state of which can be changed by a manipulation of a user, and it is configured to determine the state of the component. The function module comprises at least one execution command signal generating unit for generating execution command signals. The control unit is configured to receive the execution command signals from the function module and to actuate various devices responding to the execution command signal.

It is preferable that some of the components are interconnected with each other such that if a state of one of the interconnected components is determined, states of the other components are automatically determined.

Preferably, when the states of the other components are automatically determined by the determination of the one component, the function module simultaneously generates execution command signals corresponding to the determined states of the interconnected components.

It is further preferable that the components of the user interface module comprise a static component, an input component, and an output component.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
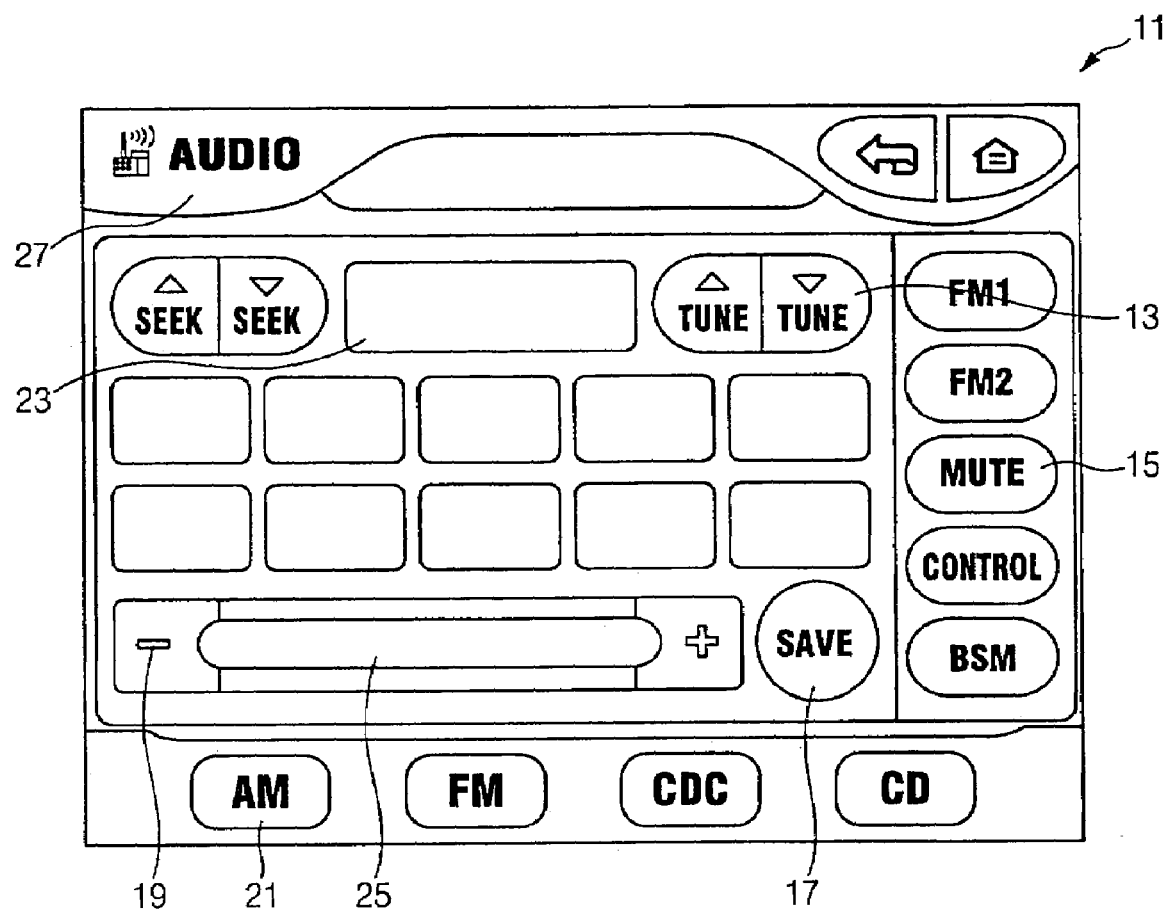
FIG. 1 shows a driver interface of a driver's information system according to a preferred embodiment of the present invention.

An exemplary driver interface 11 of a driver's information system can be a touch screen, as shown in FIG. 1. The driver interface 11 includes at least one input component 13, 15, 17, 19, and 21 through which an execution command for performing, a specific function of various vehicle devices (for example, an air-conditioning system, a radio system, and the like) is input by a driver's manipulation of the same. At least one output component 23 and 25 is provided for displaying changed states of the components. A static component 27 may also be included that is not changeable.

The input components 13, 15, 17, 19, and 21 serve as input units, and the state of these components can be changed by manipulation of a driver (or a user). Further, states of the input components 13, 15, 17, 19, and 21 can be changed through interconnection with each other. That is, through interconnection with each other, states of the input components 13, 15, 17, 19, and 21 can change states of other components, as well as the displayed image of the driver interface 11.

The output components 23 and 25 typically do no serve as input members, but a state of the output components 23 and 25 can be changed according to changed states of the input components.

The driver's information system is configured to perform a specific function corresponding to a driver's manipulation of the input components 13, 15, 17, 19, and 21 of the driver interface 11. The static component 27 cannot be changed, that is, it has one state. Accordingly, it maintains its initial appearance even when the driver manipulates the driver interface 11. On the other hand, it is preferable that the input components 13, 15, 17, 19, and 21 and the output components 23 and 25 have at least two states.

By configuring the input and output components to have more than two states, a button operation or a toggle operation can be realized through manipulations of the components. For example, if a component has two states, e.g., a touch-on state and a touch-off state, and the component is configured to be in an active state during the touch-on state and to be in a normal (inactive) state during the touch-off state, the manipulation (touch on or touch off) of the component results in the button operation.

Furthermore, if a state of the component is configured to be changed by the touch on or the touch off, the toggle operation can be realized. Similarly, if the component is configured to be changed into the active state by the touch on and to be changed into the normal state by the touch off, or if the component is configured to be changed into the normal state by the touch on and to be changed into the active state by the touch off, the toggle operation can also be realized.

If the component is configured to be changed among three states, one-way state change (state 1→state 2→state 3→state 1→state 2→state 3) or two-way state change (state 1→state 2→state 3→state 2→state 1) can be realized. That is, if the component having three states is configured to be changed among the states by the touch on or the touch off, the one-way or two-way state change can be realized. Furthermore, even when a number of states of the component is greater than three, the one-way state change and the two-way state change can similarly be realized.

Figure 2:
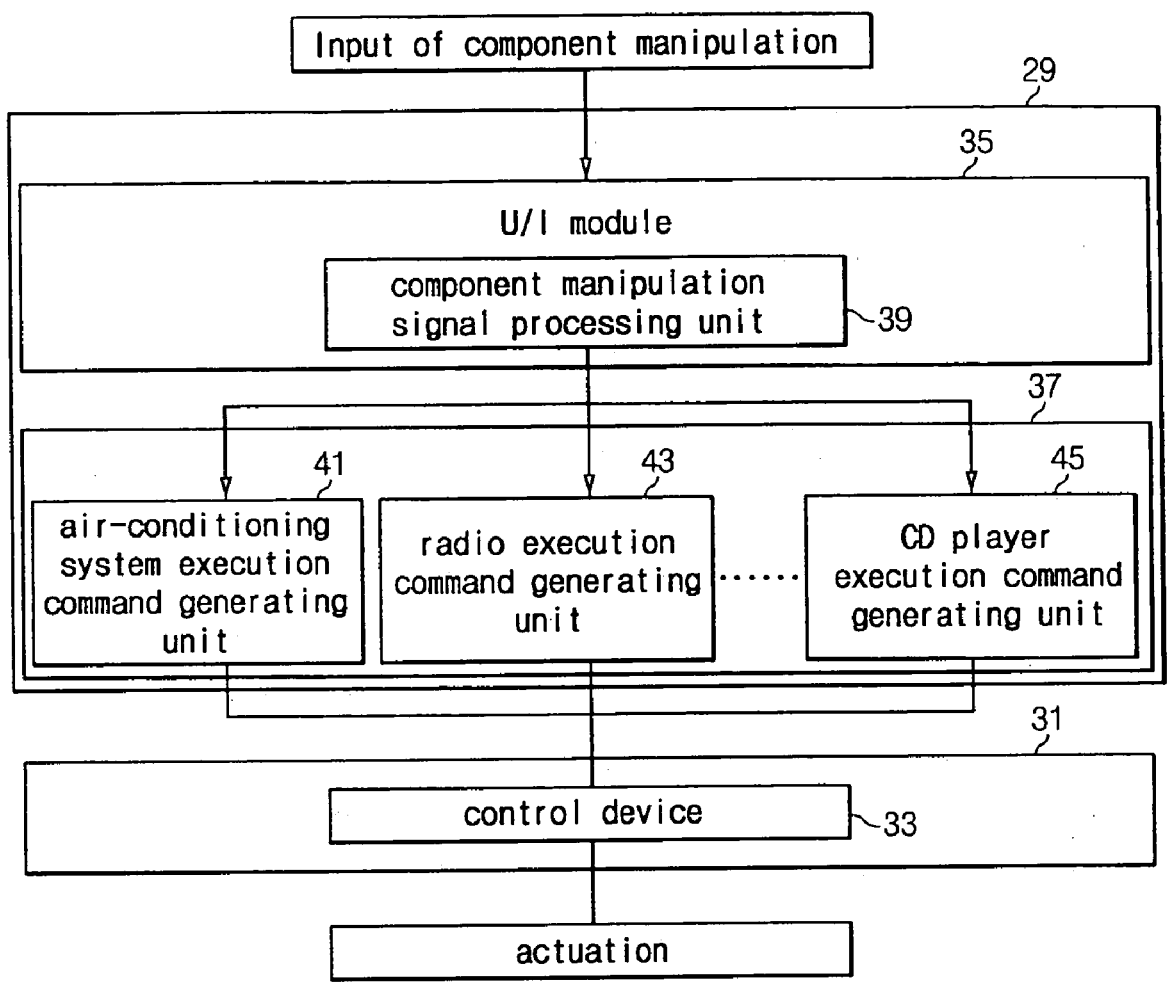
FIG. 2 is a diagram schematically showing a software portion and a hardware portion of the driver's information system according to the preferred embodiment of the present invention.

As shown in FIG. 2, the driver's information system according to the preferred embodiment of the present invention comprises a software portion 29 and a hardware portion 31. The software portion 29 determines a state of each component of the driver interface 11 responding to a driver's manipulation of the component, and generates a function execution command signal for a specific function corresponding to the determined state of the component. The software portion 29 may comprise a processor and associated hardware as may be selected and programmed by a person of ordinary skill in the art based on the teachings of the present invention.

The hardware portion 31 comprises a control device (or an actuator) 33 for receiving the function execution command signal from the software portion 29, and it is configured to actuate various vehicle devices according to the execution command signal.

The software portion 29 comprises a user interface (U/I) module 35 that is configured to receive a component manipulation input signal and to determine a state of each component of the driver interface 11, and a function module 37 for generating execution command signals for driving the control device 33. The user interface module 35 includes a component manipulation signal processing unit 39 for determining a state of each component., The above-stated driver interface 11 is a portion of the user interface module 35, and it is connected to the component manipulation signal processing unit 39. If a signal corresponding to the manipulation of the components of the driver interface 11 is supplied to the component manipulation signal processing unit 39, the component manipulation signal unit 39 determines a state of the component based on predetermined processing logic.

The function module 37 includes a plurality of execution command generating units 41, 43, and 45 for generating execution command signals for driving the control device 33 that actuates various devices. The function module 37 may include, for example, an air-conditioning system execution command generating unit 411, a radio execution command generating unit 43, and a CD player execution command generating unit 45.

For example, if the user interface module 35 determines that a specific component relating to an operation of an air-conditioning system is in a state for driving the air-conditioning system, the air-conditioning system execution command generating unit 41 of the function module 37 generates an execution command signal for driving the control unit 33 to drive the air-conditioning system.

Figure 3:
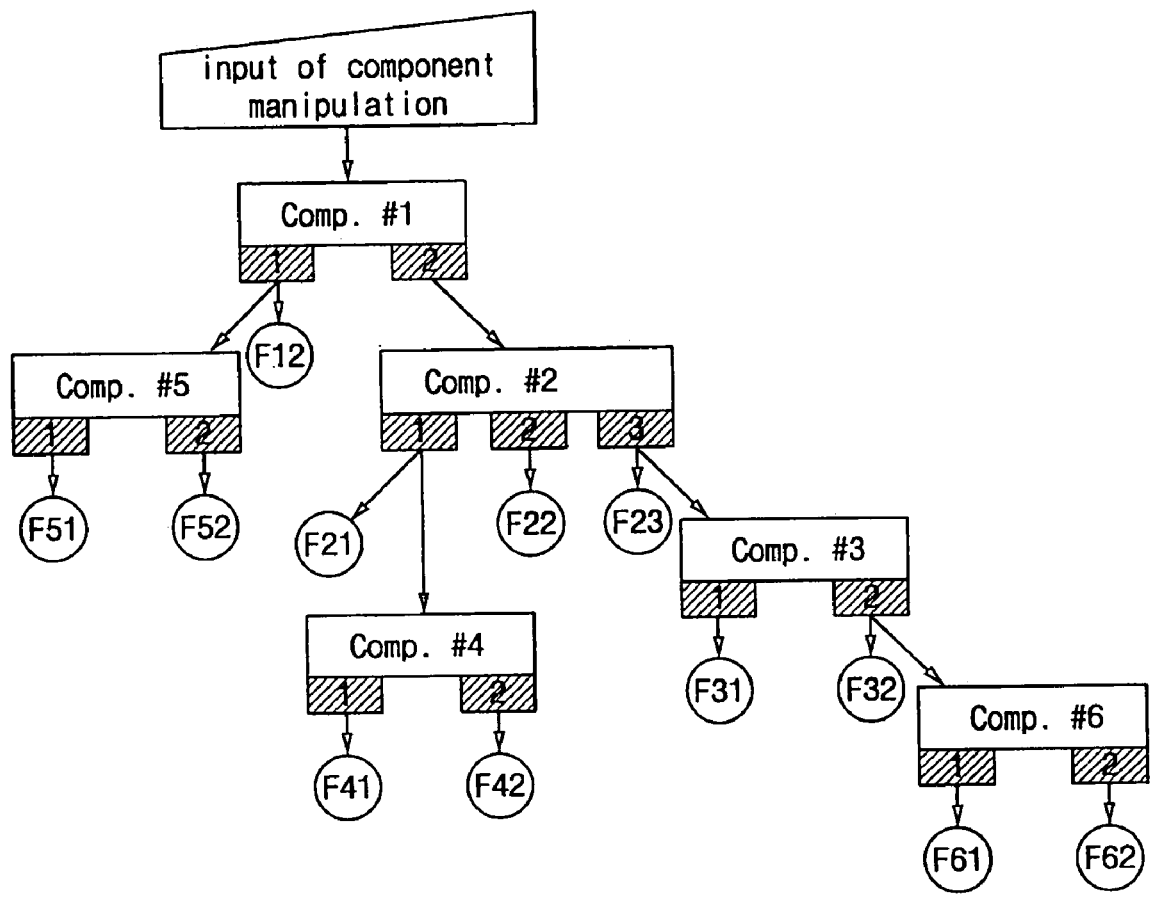
FIG. 3 is a diagram showing interconnected manipulation components of the driver's information system.

Preferably, in the driver's information system according to a preferred embodiment of the present invention, the user interface module 35 is configured to interconnect the states of the components of the driver interface 11 with each other, and thereby more complicated command execution can be realized. That is, as shown in FIG. 3, some states of components are connected with each other. Consequently, a determination of a state of one of interconnected components results in automatic determination of states of the other components, so various commands can be performed simultaneously.

For example, as shown in FIG. 3, if a state of a component 6 (Comp. #6) is determined to be "1", it is configured that execution commands "F23", "F32", and "F61" are performed simultaneously; if a state of a component 5 (Comp. #5) is determined to be "2", it is configured that execution commands "F52" and "F12" are performed simultaneously; and if a state of a component 4 (Comp. #4) is determined to be "2" it is configured that execution commands "F42" and "F21" are performed simultaneously. Here, the state of each component can be changed by direct manipulation Although preferred embodiments of the present invention have been described in detail hereinabove, it should be clearly understood that many variations and/or modifications of the basic inventive concepts herein taught which may appear to those skilled in the present art will still fall within the sprit and scope of the present invention, as defined in the appended claims.

Because the driver's information system according to the preferred embodiment of the present invention is provided with a function module generating execution command signals and a user interface module for determining a state of each component of the driver interface as separate members, a state determination corresponding to the manipulation of a component and a corresponding execution command signal generation is performed separately. One resulting advantage is it-is easy to independently update the function module and the user interface module. Accordingly, various newly developed driver interfaces can easily be adapted to the driver's information system. Therefore, it is possible to provide maximized driver interfaces for various user groups. Furthermore, by interconnecting the state of the components, various execution commands can be generated by a single manipulation.

What is claimed is:

1. A driver's information system, comprising:

a user interface module comprising plural components, a state of each of which can be changed by a manipulation of a user, the user interface module being configured to determine states of the components, wherein at least two of the components are interconnected with each other such that if a state of one of the interconnected components is determined, states of other interconnected components are automatically determined;

a function module configured to receive user input from said interface module and comprising at least one execution command signal generating unit for generating execution command signals; and a control unit configured to receive the execution command signal from the function module and to actuate various devices responding to the execution command signal.

2. The driver's information system of claim 1, wherein when the states of the other interconnected components are automatically determined by the determination of the one component, the function module simultaneously generates execution command signals corresponding to the determined states of the interconnected components.

3. The driver's information system of claim 1, wherein the components of the user interface module comprise a static component, an input component, and an output component.

* * * * *